United States Patent Office 3,515,005
Patented June 2, 1970

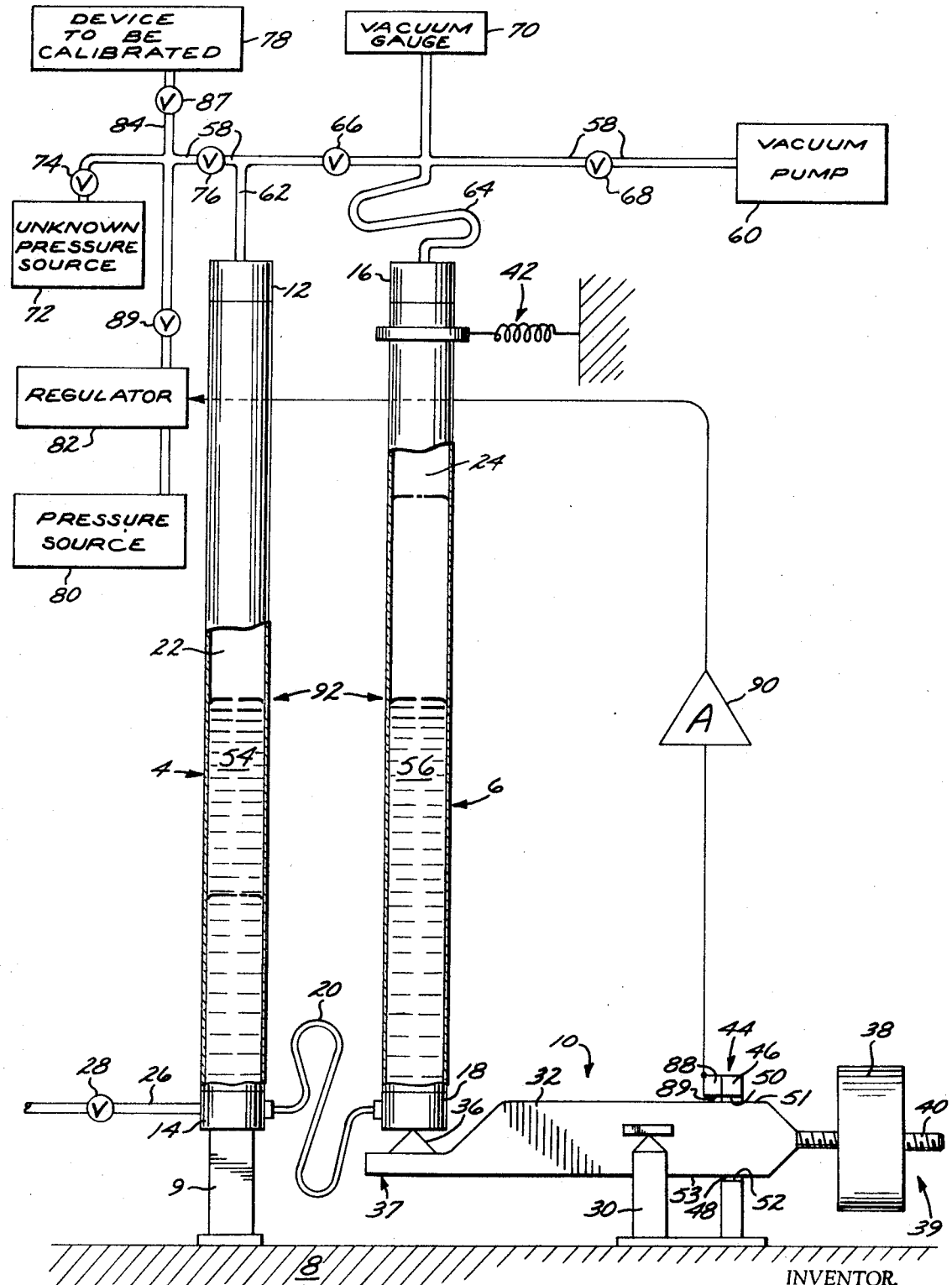

1

3,515,005
HIGH-PRECISION SYSTEM FOR MEASURING AN UNKNOWN FLUID PRESSURE AND FOR GENERATING A PREDETERMINED FLUID PRESSURE
George J. Brown, Riverside, Calif., assignor to Transmetrics Incorporated, Newport Beach, Calif., a corporation of Delaware
Filed Aug. 7, 1967, Ser. No. 658,929
Int. Cl. G01l 7/02
U.S. Cl. 73—405                          13 Claims

ABSTRACT OF THE DISCLOSURE

In the pressure measuring embodiment the fluid is introduced into one of a pair of interconnected mercury filled manometer tubes and the mass of mercury which transfers from one tube to the other is measured by weighing one of the tubes. The measured mass is proportional to the unknown pressure. The only parameters needed to determine the proportionality factor are the measured mass of transferred mercury, the cross-sectional area of the bore of each tube, and the value of acceleration due to local gravity. Since mercury density is not a parameter, the system is essentially temperature independent. In the pressure generating embodiment, by unbalancing the weighing means a predetermined amount, and then introducing gas from a regulator into said one tube until the scale balances, an exact predetermined pressure is generated.

BACKGROUND OF THE INVENTION

Field of the invention

This invention relates to a high-precision system for measuring fluid pressure and for producing a precise fluid pressure for uses including the calibration of pressure measuring devices. More particularly, this invention relates to such a system which eliminates the importance of mercury density and which is therefore essentially independent of ambient temperature.

Description of the prior art

The conventional manometer employs a U-shaped manometer tube supporting a mercury column in each leg, one leg being under vacuum. The pressure to be measured is introduced into the other leg, producing a change in the level of the mercury column in the evacuated leg. The new level is measured by reference to a scale alongside the tube. The accuracy of such a system is limited because the volume of the mercury, and therefore its level, changes with changes in ambient temperature. Various methods and devices for compensating for errors due to temperature changes have been developed. However, such methods and devices add to the complexity of the manometer itself and/or require that the entire instrument be maintained at constant temperature.

An early patent (U.S. Pat. 703,753, issued to M. Arndt on July 1, 1902) suggested measuring pressure by means of a balance holding a pair of communicating vessels partially filled with a liquid. One is exposed to atmosphere and the other to the unknown pressure. The pressure difference is indicated by the stroke of the pointer across the scale. This is a very crude apparatus and does not suggest the basic concepts of the present high-precision system.

SUMMARY OF THE INVENTION

In the pressure measuring or manometer embodiment of this invention, fluid pressure is measured by weighing a column of a liquid such as mercury (rather than by measuring its height). A pair of tubes are partially filled with a liquid and are connected at their lower ends to provide liquid transfer from one tube to the other. One tube is fixedly mounted and the other tube is suspended on a weighing scale which is put into exact balance as a reference point from which the measuring operation begins. The fluid whose pressure is to be measured is introduced at the top of one of the tubes, causing a quantity of the liquid to transfer from one tube to the other. The mass of the transferred liquid is measured by bringing the weighing scale back to its initially balanced condition. The value of the unknown pressure is obtained by multiplying the measured mass by a suitable proportionality factor. The equation from which the proportionality factor is calculated does not include the density of the liquid as a parameter. For this reason the system is essentially temperature independent.

In accordance with the pressure generating embodiment of the invention, the scale is first unbalanced by an amount that is equivalent to the desired pressure, the equivalence being given by the above-mentioned equation. Fluid from a pressure regulator is then introduced into the fixed tube and its pressure increased until the scale balances. The pressure which balances the scale is then used for purposes such as calibration of another instrument.

It is therefore a primary object of the present invention to provide a system for measuring and/or generating a fluid pressure to an extremely high degree of precision, which system is not subject to the disadvantages of previous systems such as those which measure the height of a column of mercury.

It is another object if this invention to provide a fluid pressure measuring and/or generating system which is essentially independent of mercury density and therefore of ambient temperature changes.

It is a further object of the present invention to provide a fluid pressure measuring and/or generating system which removes the need for an assumption as to the basic density of the liquid used (for example mercury).

A further object of the present invention is to provide a fluid pressure measuring and/or generating system which requires no temperature controlled cabinet but instead operates satisfactorily in the usual laboratory environment.

An additional object of the invention is to provide a fluid pressure measuring system which provides a relatively fast slew rate.

A further object of the present invention is to provide a fluid pressure measuring and/or generating system which meets all performance specifications over a wide temperature range.

It is another object of the present invention to provide a fluid pressure measuring and/or generating system which can withstand sudden surges and/or overpressures of 150 percent maximum range without damage or loss of mercury.

A further object of the present invention is to provide a fluid pressure generating system which can be operated as either an open loop system (manually) or a closed loop system (automatically).

Another object of the present invention is to provide a fluid pressure measuring and/or generating system which permits an operator to achieve an extreme degree of sensitivity and resolution, within plus or minus 0.00001 inch of mercury, by knowing to a high order of precision (1 part in 400,000) only three things: (1) The measured mass of the transferred mercury, (2) the cross sectional areas of the bores of the two manometer tubes, and (3) the value of acceleration due to gravity at the manometer site. Since the last-named parameter is usually known to within 1 part per 1,000,000 at most standard laboratory locations, the first two items are the most significant for the user of the present invention.

BRIEF DESCRIPTION OF THE DRAWING

The figure is a diagrammatic, partly schematic view of the apparatus of the present invention.

DESCRIPTION OF THE PREFERRED EMBODIMENTS

The pressure measuring embodiment

Referring to the figure, the apparatus of the present invention comprises a pair of vertically mounted, elongated tubes 4 and 6, each having a uniform, precision bore. In the preferred embodiment the tubes 4 and 6 are made as nearly identical as is possible. However, as will appear hereinafter, this is not necessary but is only the presently preferred embodiment.

One tube 4 is fixedly mounted to a supporting means or base 8, as by means of a support pedestal 9. The other tube 6 is suspended on a weighing system 10. The ends 12 and 14 of the fixed tube 4, and the ends 16 and 18 of the suspended tube 6, are suitably sealed as by means of (for example) stainless steel plugs and associated O-rings. The lower ends 14 and 18 of the tubes 4 and 6, respectively, are in fluid communication by means of a tube 20 having a small bore of predetermined diameter (a ⅛ inch bore diameter is satisfactory when using mercury as the liquid). The tube 20 is formed into several convolutions to minimize any elastic restraint between the tubes 4 and 6. Tube 20 may be formed of stainless steel or any other suitable material.

The chambers 22 and 24 within the tubes 4 and 6, respectively, are partially filled with mercury. The mercury may be introduced into the fixed tube 4 through a feed line 26 provided with a fill valve 28.

The weighing system 10 comprises a pedestal 30 which supports a weigh beam 32 by means of a knife edge pivot 34, the latter contacting a support arm portion 35 of the beam. The suspended tube 6 is mounted on one end 37 of the beam 32 by means of a knife edge 36. The beam 32 is balanced by means of a counterweight 38 rotatably mounted on a precision lead screw 40 at the other end 39 of the beam. Since the use of precision lead screws is well known in the art, the counterweight 38-lead screw 40 unit need not be described in detail. However, it is noted that the shifting of the counterweight 38 along the lead screw 40 can be known to a high degree of accuracy by counting, by means of a vernier scale, for example, the revolutions or portions of revolutions which the counterweight 38 makes.

The suspended tube 6 is mounted by means of knife edge 36, rather than being fixedly mounted to the beam 32, in order to assure that the mass of the mercury column in the tube 6 is always applied at the same point on the beam 32. If the tube 6 were fixedly mounted to the end of the beam 32, even a slight unbalanced condition in the beam would mean that the projection of the center of gravity of the tube 6 would vary along the length of the beam 32, thus leading to errors. Additional support means 42 may be provided along the height of the tube 6 as is necessary to ensure that the tube 6 remains vertical. The illustrated support means 42 is a spring, being only exemplary of numerous spring or other support systems which can be utilized.

In order to determine when the weighing system 10 is in balance, a suitable balance-indicating means 44 is provided. The means 44 comprises a vertical post 46 which is mounted fixedly on support 8 and has a vertical groove 48 therein. The vertical dimension of the groove 48 is just greater than the width of the balance beam 32, so that the groove may receive the beam with only a slight clearance. The post 46 therefore provides an upper stop 50 and a lower stop 52. When the beam is exactly horizontal, and is therefore balanced, the upper surface 51 of the beam is spaced a predetermined distance from the upper stop 50 and at the same time the lower beam surface 53 is spaced an identical predetermined distance from the lower stop 52. By this means the beam can be determined to be in balance by visually observing whether or not the beam 32 is in contact with either the upper stop 50 or the lower stop 52.

A scale and pointer can, if desired, be used in addition to or in place of the pair of stops 50 and 52. Further, other types of weighing systems can be used. As will be fully described below, the more accurate the weighing system used, the more accurate will be the pressure measurements.

The portions of the chambers 22 and 24 above the mercury columns 54 and 56 in the tubes 4 and 6, respectively, are connected into a fluid communication system. Such system comprises a main fluid line 58 which extends between a vacuum pump 60 at one end thereof to various pressure sources, etc., at the other end thereof. The two chambers 22 and 24 are connected in fluid communication with the main fluid line 58 by means of fluid flow lines 62 and 64, respectively. More specifically, the lines 62 and 64 extend through and are hermetically sealed to the stainless steel plugs in the ends 12 and 16 of the tubes 4 and 6, respectively. The flow line 64 which extends to the suspended tube 6 is formed into several convolutions to minimize the application of any force to the suspended tube 6. The tube chambers 22 and 24 can be caused to be in fluid communication or in fluid isolation, relative to each other, by opening or closing, respectively, an isolation valve 66 in the main flow line 58.

Vacuum pump 60 is connected to the main flow line 58 through a valve 68. A vacuum gauge 70 is connected directly to the chamber 24 by being connected to the main line 58 at a point between the two valves 66 and 68. At the other end of the main flow line 58, an unknown pressure, illustrated schematically as an unknown pressure source 72, is connected into the main flow line 58 through series-related valves 74 and 76. In the use of this invention as a barometer, the unknown pressure source can simply be a vent to atmosphere.

Pressure measuring method

The method of measuring an unknown pressure will now be set forth, in particular reference to the apparatus as thus far described. First, the vacuum valve 68 and the isolation valve 66 are opened and the valves 74 and 76 are closed. Suitable valves (to be described hereinafter) in lines connected to line 58 between valves 74 and 76 are also closed.

The vacuum pump 60 is then turned on to evacuate the chambers 22 and 24. It is preferred, in order to achieve a high degree of accuracy, that a vacuum down to at least 10 microns of mercury be established in the chambers 22 and 24.

The weighing system 10 is then adjusted to obtain a zero reading (a balanced condition). This is achieved by adjusting the counterweight 38 until the beam 32 rides in between the stops 50 and 52 and is not in contact with either.

After the above has been accomplished, the isolation valve 66 is closed and the valves 76 and 74 are opened to introduce the fluid from the unknown pressure source 72 into the chamber 22 of the fixed tube. This unknown pressure will force mercury from the mercury column 54 through the tube 20 and into the suspended tube 6. As soon as an equilibrium condition has been established, that is to say after the transfer of mercury from tube 4 to tube 6 has terminated, the operator readjusts the counterweight 38 of the weighing system 10 to once again balance the beam 32 and produce a zero reading.

The object of the rebalancing is to obtain the value of the mass of mercury added to tube 6 (the importance of using a weighing means which weighs by bringing the beam back to its starting point will be described below). The total mass required to achieve balance is a direct measure of the total amount of mercury transferred to the suspended tube 6, and is also a direct measure of the unknown pressure in the chamber 22. By multiplying the measured mass required to achieve rebalance of the beam, by a suitable proportionality factor, the unknown pressure can be obtained in whatever units are desired. As will be pointed out more fully below, the change in mass can be read out directly in units of pressure.

The particular weighing means shown in the figure does not change the mass on the end 39 of the beam, but instead shifts the counterweight 38 along the beam. The measuring is usually accomplished in either a changing mass or a shifting mass type of balance by reference only to the force (the torque or moment about the pivot being equal to the force times the lever arm) by employing equal lever arm distances. The weighing means 10 changes the lever arm distance rather than by adding or subtracting weights (this latter type of balance can also be very effectively used in this invention). The revolutions or portions of revolutions of the counterweight 38 can be read off (calibrated) in terms of mass, if desired, so that by counting the revolutions required to rebalance the scale, the amount of added mass which this shifting of mass is equivalent to can be determined with respect to the originally balanced position. In other words, the position of the counterweight 38 at any one point along the lead screw 40 with respect to any other point along the lead screw 40 is equivalent to having added or subtracted a known mass to that point of the lead screw 40 which has (normally) the same length lever arm as does the support point for the tube 6. With this in mind, no question should arise when reference is made to the mass required to rebalance the beam 32.

Derivation of the basic equation

The basic equation used in the system of the present invention will now be developed. This equation will illustrate why the system of the present invention is essentially free of errors due to ambient temperature changes, and will further illustrate why the only parameters needed to be known to a high degree of accuracy to provide extremely accurate fluid pressure measurement are (1) the cross sectional area of the bore of each of the tubes 4 and 6, (2) the value of acceleration due to local gravity, and (3) the measured mass of transferred mercury.

The various terms used in the derivation of the equation are defined as follows:

$A_1$—Area of the bore of the suspended tube 6.
$V_1$—Change in volume of the mercury in tube 6.
$L_1$—Length of the change in the mercury level in tube 6.
$A_2$—Area of the bore of the fixed tube 4.
$V_2$—Change in volume of the mercury in tube 4.
$L_2$—Length of the change in mercury level in tube 4.
$\rho_{Hg}$—Density of the mercury used in the locked mercury column.
M—Measured mass required to rebalance the scale.
g—Acceleration due to local gravity.
V—Total volume of mercury in the lengths $L_1$ and $L_2$ of the tube 6 (the distance between the two mercury levels is $L_1+L_2$, and the volume of the head of mercury in tube 6 produced by the unknown pressure is $$A_1L_1+A_1L_2).$$

P—The unknown pressure producing the change in the mercury level.

Initially it is noted that when the unknown pressure P has been introduced, the system has equalized, and the weighing system has been rebalanced, then the balanced condition can be stated as follows:

(I) $$Mg = \rho_{Hg}gV_1$$

The unknown pressure P which produces the change in mercury level can be written as follows:

(II) $$P = \frac{\rho_{Hg}gV}{A_1}$$

(III) $$P = \frac{\rho_{Hg}g(A_1L_1+A_1L_2)}{A_1}$$

$$A_1L_1 = V_1$$

$$P = \frac{\rho_{Hg}g(V_1+A_1L_2)}{A_1}$$

$$A_1L_1 = A_2L_2$$

$$L_2 = \frac{V_1}{A_2}$$

(IV) $$P = \frac{\rho_{Hg}g\left(V_1+V_1\frac{A_1}{A_2}\right)}{A_1}$$

$$P = \rho_{Hg}gV_1\left(\frac{1}{A_1}+\frac{1}{A_2}\right)$$

(V) $$P = Mg\left(\frac{1}{A_1}+\frac{1}{A_2}\right)$$

An example, using typical values, and providing an additional correction factor, is set forth below following the description of the pressure generating embodiment.

The pressure generating embodiment

Referring once again to the figure, a pressure source 80 has its output connected to a pressure regulator 82. The regulator 82 is connnected through line 86 and valve 89 to the main line 58 between the valves 74 and 76. A variable pressure can thus be introduced into the chamber 22 of the fixed tube.

One of the uses of this embodiment is to produce an exact pressure for calibrating pressure measuring devices. A device 78 to be calibrated is shown connected by a line 84 and a valve 87 to the main line 58. It is connected to the line 58 between valves 74 and 76 and can therefore, by opening valve 87, be connected directly to the output from the regulator 82.

The regulator 82 can be one which is manually operated, that is, it can have a manual control by which the output pressure can be increased or decreased. The regulator can also be automatic in that the pressure controller can be set to increase pressure at a certain rate, and can (in response to an electrical or other signal) immediately stop increasing pressure. Such regulators are well known and need not be described in detail here. When the regulator is to apply pressure to an evacuated container it is of the vacuum regulator type. Various regulators can be used in this invention, an appropriate one being Kendall Model 116, made by Fairchild Hiller.

When it is desired to produce the predetermined pressure automatically, a transducer 88 is positioned adjacent the beam 32, for example, by being mounted adjacent the stop 50, such that a finger 89 of the transducer just touches the beam 32 when it is in balance. When the transducer senses the presence of the beam 32, that is to say when the beam first contacts the transducer, the transducer generates an electrical signal which is fed into the regulator 82 through an amplifier 90.

The pressure generating operation

An open loop system (a manual method) for producing an exact calibrating pressure for use in calibrating a device, or for any other purpose, will now be described.

The valves 74, 76, 87 and 89 are closed and the valves 66 and 68 are opened in order to evacuate the chambers 22 and 24 by means of the vacuum pump 60 as in the pressure measuring operation. After this has been done the operator balances the weighing system 10 to obtain a zero reading. Then from this zero reading the counterweight 38 is shifted toward the end 39 of the beam by a number of revolutions which is equivalent to that mass which is equivalent to the desired pressure which is to be used as the calibrating pressure. The basic mass-pressure equation giving the equivalence was developed above.

The isolation valve 66 is then closed and the valves 76 and 89 are opened. The pressure control on the regulator 82 is then manually adjusted to begin increasing pressure. During this time the operator visually observes the beam 32. When the beam is rebalanced, the operator stops increasing pressure. The pressure from the regulator 82 and the pressure source 80 is now equal to the desired pressure which is to be used (for example) to calibrate the device 78. The device 78 can now be calibrated by opening the valve 87.

The predetermined pressure can be produced automatically by the above-described closed loop system, as follows. The same procedure as in the manual or open loop system is followed identically down to the steps of unbalancing the weighing system by the proper amount, closing the isolation valve 66 and opening valves 76 and 89.

A pressure increase switch on the regulator is switched on to provide a constantly increasing pressure. Mercury begins to flow from tube 4 to tube 6. When the pressure from the regulator begins to approach the desired pressure the beam 32 begins to lift off of the lower stop 52. As soon as the beam actually resumes its balanced position, the transducer 88 senses the beam 32 (such as by the beam contacting the finger 89 of the transducer) and produces an electrical signal. This signal is amplified by amplifier 90 and sent to the regulator where it turns off, as for example by use of a solenoid, the pressure increase switch. The regulator is now producing a uniform pressure having a value equal to the desired pressure.

Higher accuracy could be provided by using a more complex electrical circuit, such as for example a servo which would start reducing the increase in pressure as the beam starts to approach balance.

This predetermined pressure can now be used to calibrate the device 78 as discussed above in the open loop system. It is noted that this is just an example of one use that can be made of the capability to produce a precise pressure of predetermined value.

Example of development and use of a correction factor

This basic equation can be modified, in order to improve the accuracy of the results obtained by the system of the present invention, by including a minor correction factor. This example is in reference to the measuring of air at a pressure higher than that initially in the tubes (for example, measuring atmospheric pressure with the tubes evacuated). Because the instrument operates on a mercury column principle, the mercury level in the high pressure tube can change as much as, for example, 30 inches in elevation over the range of a typical instrument. This change in elevation introduces a slight change in measured pressure due to the differences in the head of air above the mercury level in the fixed tube 4 and above the pressure port. For that reason a correction can be made in the proportionality constant to accommodate this change in mercury level to reference all pressures to the pressure port elevation of the apparatus. For the purposes of this example it will be assumed that the pressure port of the apparatus shown in the figure is at the same level as the level 92 of the two mercury columns 54 and 56 when they are initially at the same level and when the tube 6 is in the balanced condition prior to the introduction of the fluid of unknown pressure into the chamber 22.

The terms used in developing this correction factor are as follows:

E—Correction in dynes per square centimeter.
H—Elevation difference in centimeters (the difference between the port elevation and mercury level in the fixed tube).
$p$—Pressure being measured in dynes per square centimeter.
$\rho_A$—Density of the air=$1.16141 \times 10^{-6}$ gms./cm.$^3$.

Since the error is proportional to each of the terms H, $p$, and $\rho_A$, the equation of the fluid elevation correction can be written as follows:

(VI) $$E = pH\rho_A$$

In order to take the variable H out of the equation, we use the relationship that one inch of mercury (standard)=33,864 dynes/cm.$^2$. This is equivalent to 0.00254 cm./33,864 dynes/cm.$^2$. Therefore, $$H/p = 0.000075 \text{ cm./dynes/cm.}^2$$

The fluid elevation correction formula can now be written as (VII)
$$E = p^2 \frac{H}{p} \rho_A$$

$$E = p^2 (7.5 \times 10^{-5})(1.1614 \times 10^{-6}) = 8.71 \times 10^{-11} p^2$$

Values of $p$ were chosen and the corresponding values of H were calculated. The sets of values were then plotted on a graph of H vs. $p$. Although this graph is of course the graph of a parabola, it is sufficient to use an approximate correction obtained as the closest straight line approximation to the plotted curve. The value of 2.4 dynes/cm.$^2$/inch of mercury was obtained.

The fluid elevation correction means that the pressure at the mercury surface is greater than the pressure at the pressure port due to the larger head of air thereabove by an amount equal to the correction factor:

$$\frac{2.4}{33864} = 0.0000708$$

Factor=$1 - 0.0000708 = 0.999929$

EXAMPLE

The basic equation has now been developed with a correction for fluid elevation. To provide an example, the manometer site can be considered to be at sea level and a sample correction will be made to indicate the nature of the change in the proportionality constant to accommodate the correction.

The basic equation is $$P = Mg \left( \frac{1}{A_1} + \frac{1}{A_2} \right)$$

(Equation V, developed above)

let $g = 979.597$ cm./sec.$^2$
let $A_1 = A_2 = 10.2173$ cm.$^2$
$P$ (dynes/cm.$^2$) = $M$ (grams) $(979.597)(0.195746)$ Now, introducing the fluid elevation correction:

(0.195746)
$P$ (dynes/cm.$^2$) = $M$ (grams) $(0.999929)(979.597)$

Now, converting to inches of mercury (standard):

1.000 inch of mercury (standard) = 33,863.9 dynes/cm.$^2$ $P$ (inches of mercury standard)
$$= \frac{M(0.999929)(979.597)(0.195746)}{33,863.9}$$

$P$ (inches of mercury standard)
$$= 0.005466114 \, M \text{ (grams)}$$

From this we see that:

1.00 inch of mercury standard = 176.642 grams

From Equation V, it is seen that the only parameters which are needed to be known to a high degree of accuracy in order to provide an extremely accurate fluid pressure measuring system, are (1) the value of acceleration due to local gravity, (2) the cross sectional area of the bore of the two tubes 4 and 6, and (3) the measured mass of the transferred mercury. Further, as stated above, by knowing these values to a precision of 1 part in 400,000, this system can achieve a sensitivity of plus or minus 0.00001 inch of mercury, with an overall instrument accuracy of plus or minus 0.001 inch of mercury including all sources of errors and uncertainties. This applies to any point in the range 0–60 inches of mercury.

As further stated above, the value of acceleration due to local gravity at standard laboratory sites is usually known to 1 part in 1,000,000. Precision weights can be adjusted to a Class S tolerance of 1 part in 400,000 and are known to 1 part per 1,000,000. The tube area can be determined by measuring the average tube diameter at one inch increments along its entire length through the use of an air gauge calibrated against a XXXX master gauge. The tubes are measured while held vertically to duplicate the manner in which they are used. Change in tube dimensions with temperature, pressure, or other loading is for the most part negligible. The tube area can be determined to 1 part in 150,000.

One useful type of weighing system is that illustrated in the drawing. However, the present invention can employ any one of a number of types of weighing systems. The more accurate the weighing system the more accurate the system of the present invention, assuming the other two parameters are accurately known.

As mentioned above it is important, for high accuracy, that the mass of the transferred mercury be measured by rebalancing the beam, that is, the beam should be balanced initially and should then be rebalanced. Actually it would be just as accurate, although not as preferred or practical, to start out with the beam in any position, as long as that postiion is known accurately, and then bringing the beam back to that same position. The reason for this is that if the transferred mass were measured with the suspended tube at a different height or elevation than that which it had when initially balanced, some mercury would flow into (or out of the suspended tube by gravity, which gravity force would be in addition to the force of the fluid pressure which is to be measured.

Another advantage of weighing the mass of transferred mercury with the suspended tube at its rebalanced position relates to the effect on the suspended tube of the various fluid flow lines (and any other means) connected thereto. While such lines are designed to apply as little restraining force as is possible to the suspended tube, any effect they might have can be essentially eliminated by measuring the suspended tube when rebalanced. Whatever force is applied by such lines is taken into consideration by the initial balancing. The lines apply the same force to the tube when rebalanced so that any effect is essentially eliminated.

It is noted that only the preferred embodiment of the present invention has been described above. Other arrangements can be used. For example, the two tubes 4 and 6 do not necessarily have to have a bore of the same area. If the suspended tube 6 had an area only 1/100 that of the fixed tube 4, the sensitivity of the system would be essentially doubled. This is because the entire head of mercury in this case would be weighed rather than in the preferred embodiment shown in the drawing wherein only approximately half of the total head of mercury is weighed.

Further, the present invention can employ only a single tube in which case, of course, only one area would have to be known. In this case, the fixed tube would have the mercury level maintained at a fixed reference level, for example, by means of a capacitor plate level indicator of the type used in manometers which measure changes in mercury level. When the pressure is introduced into the fixed container, a signal from the capacitor plate level indicator can be fed to a pump to force mercury into the bottom of the fixed tube or container from whence it would flow into the suspended tube. This is similar to the system shown in the drawing except that instead of obtaining the transferred mercury from the top of the fixed tube the mercury which is to be transferred to the suspended tube would be obtained from a source connected to the lower portion of the fixed tube so as not to change the mercury level in the fixed tube.

Further, it is to be noted that it is not necessary that the tubes be evacuated in order for the present invention to operate successfully. For example, the two tubes could be held at identical atmospheric pressure and then hermetically sealed prior to introducing the unknown pressure to be measured into the fixed tube. The unknown pressure can of course be a higher or a lower pressure than that already in the balanced tubes. Where a vacuum is not used, however, and high accuracy were desired a correction factor would have to be employed due to the fact that the gas above the column of mercury in the suspended tube would be either compressed or expanded and this would produce an error.

The present invention is not limited to use with the particular materials specified in the description. The liquid used in the two tubes can be a liquid other than mercury. Water or oil or any other suitable liquid can be employed. The preferred material for use in making the tubes 4 and 6 is "Pyrex" glass, because such material has a very low temperature coefficient of expansion. Other materials having a low temperature coefficient of expansion can be used in place of the "Pyrex" glass tubes.

Although the tubes are cylindrical and have a cylindrical bore, this is not necessary to the present invention. In fact, the outside shape of the container has no bearing whatever on this invention. The chamber should have a uniform area, but it doesn't have to be of circular cross section. It would be possible to use a nonuniform area if the average area were known accurately through the lengths $L_1$ and $L_2$.

The present invention is not limited to measuring gas pressure. The system can also measure liquid pressure. In this application, the liquid would be introduced into the chamber 22 of the fixed tube 4 in the same manner as was described above for measuring gas pressure. A sealing means would be employed between the mercury column and the liquid whose pressure is being measured. This sealing means can be a piston or a flexible or rolling type diaphragm, for example.

A particular advantage of this invention is that the pressure can be read directly. The basic unit of measurement in the system of the present invention is the gram. The conversion into more conventional inches of mercury at standard conditions is accomplished by first expressing pressure as dynes per square centimeter using the gram unit and the dimensions of the tubes and the acceleration due to gravity under local conditions. This is then multiplied by a proportionality factor which will yield the desired unit. The overall conversion from the gram can be accomplished by a single factor which includes all elements of the instrument and all necessary corrections. This conversion can be facilitated electronically or mechanically by means which accept the gram input from the weighing system and directly provide pressure in inches of mercury. Additional means can be provided for conversion into other units such as pounds per square inch, pounds per square foot, and dynes per square centimeter. This capability of directly reading out the pressure was not available with previous manometers of the type which measured the height of a column of mercury.

The apparatus of the present invention can be provided with a pressure relief valve which vents the fixed tube 4 and which closes off the source of high pressure when the pressure level exceeds the upper limit of the manometer. Since the tube 20 sets the rate at which the level of mercury in the tubes 4 and 6 can change, there is no way in which a sudden pressure surge could move the mercury column any faster than the response of such an overpressure relief valve.

I claim:
1. Apparatus comprising:
   a first hermetically sealed container defining a first chamber of uniform cross-sectional area,
   a second hermetically sealed container defining a second chamber of uniform cross-sectional area,
   weighing means,
   first mounting means mounting said first container on said weighing means and in a vertical position,
   second mounting means mounting said second container in a vertical position,
   means providing liquid communication between the lower portions of said chambers,
   a first liquid column partially filling said first chamber,
   a second liquid column partially filling said second chamber,
      said liquid columns being in liquid communication through said liquid communication means,
   means for evacuating both of said chambers,
   means for isolating the upper portions of said chambers from each other whereby the vacuum in said first chamber may be maintained while fluid under pressure is introduced into the upper portion of said second chamber, and
   means for introducing a fluid under pressure into the upper portion of said second chamber,
      said fluid under pressure effecting transfer through said liquid communication means and into said first chamber of some of the liquid from said second liquid column, whereby the mass of said first liquid column is increased by an amount which represents the pressure of said fluid under pressure, and may be determined by said weighing means.
2. The apparatus according to claim 1, in which:
   said containers are substantially identically sized and shaped cylindrical glass tubes,
   said liquid forming both of said liquid columns is mercury,
   said weighing means comprises a pivotally mounted weighing beam, and
   said first mounting means comprises means for pivotally suspending said first tube on one end of said weighing beam.
3. The apparatus according to claim 1, in which said means for introducing a fluid into said second chamber comprises means for varying the pressure of said introduced fluid.
4. The apparatus according to claim 1, in which said means providing liquid communication comprises a tube of restricted bore for preventing an oversurge of pressure in said second chamber from transferring liquid into said first chamber at a rate exceeding a predetermined value.
5. The apparatus according to claim 1, in which said means for introducing a fluid comprises a fluid pressure source connected to a regulator for producing a variable pressure, and including
   a transducer for producing an electrical signal when said weighing means is in balance,
   means for amplifying said signal, and
   means for transmitting said amplified signal to said regulator.
6. The apparatus according to claim 1, including:
   means for balancing said weighing means prior to introducing said fluid into said second chamber, and
   means for rebalancing said weighing means for measuring the mass of the liquid which transfers between said containers as a result of the introduction of said fluid.
7. The invention as claimed in claim 1, in which said means for introducing a fluid under pressure is a vent to the atmosphere, whereby said apparatus operates as a barometer.
8. The method of producing a predetermined fluid pressure comprising:
   providing a first container defining a first chamber,
   providing a second container defining a second chamber,
   maintaining a liquid column in each of said containers,
   maintaining liquid communication between said columns,
   suspending one of said containers on a weighing means,
   balancing said weighing means,
   unbalancing said weighing means by an amount which is equivalent to the desired pressure,
   introducing a fluid whose pressure is to be measured into one of said chambers,
   increasing the pressure of said introduced fluid until said weighing means balances, and
   terminating said increasing step.
9. The method according to claim 8 in which said chambers have uniform cross-sectional areas, and in which said unbalancing step comprises determining said equivalence according to the following equation:

$$P = Mg \left(\frac{1}{A_1} + \frac{1}{A_2}\right)$$

wherein
P is the pressure of the fluid,
M is the mass of said amount,
g is the acceleration due to local gravity,
$A_1$ is the area of one of said containers, and
$A_2$ is the area of the other of said containers.
10. The method of producing a predetermined fluid pressure comprising:
   providing a first hermetically sealed container defining a first chamber having a uniform cross-sectional area,
   providing a second hermetically sealed container defining a second chamber having a predetermined cross-sectional area,
   maintaining a liquid column in each of said chambers,
   establishing liquid communication between said liquid columns,
   suspending said second container on a weighing means,
   evacuating said chambers,
   balancing said weighing means,
   unbalancing said weighing means by an amount of mass equivalent to the desired predetermined pressure according to the equation:

$$P = Mg \left(\frac{1}{A_1} + \frac{1}{A_2}\right)$$

wherein
P is the pressure of the fluid,
M is the amount of mass,
g is the acceleration due to local gravity,
$A_1$ is the area of one of said containers, and
$A_2$ is the area of the other of said containers,
   introducing a fluid into said first chamber, and
   increasing the pressure of said introduced fluid until said weighing means is once again balanced.
11. The method of measuring the pressure of a fluid, comprising:
   providing a first container defining a first chamber,
   providing a second container defining a second chamber,
   maintaining a liquid column in each of said containers,
   maintaining liquid communication between said columns, suspending one of said containers on a weighing means,
evacuating the portions of said chambers which are above said liquid columns,
thereafter balancing said weighing means,
thereafter introducing a fluid whose pressure is to be measured into one of said chambers, and
thereafter measuring the mass of liquid which transfers between said chambers as a result of said fluid-introducing step,
said measuring step comprising rebalancing said weighing means such that the weighing means is returned to the position it had after said balancing step.

12. The method according to claim 11, in which said chambers have uniform cross-sectional areas in vertical directions, and in which the pressure of said fluid is determined according to the following equation:

$$P = Mg\left(\frac{1}{A_1} + \frac{1}{A_2}\right)$$

wherein
P is the pressure of the fluid,
M is the mass of the amount of transferred liquid,
g is the acceleration due to local gravity,
$A_1$ is the area of one of said containers, and
$A_2$ is the area of the other of said containers.

13. The method of measuring the pressure of a fluid, comprising:
providing a first hermetically sealed fixedly mounted container defining a first chamber having a uniform cross-sectional area,
maintaining a liquid column partially filling said first chamber,
providing a second hermetically sealed container defining a second chamber having a uniform cross-sectional area,
maintaining a liquid column partially filling said second chamber,
suspending said second container on a balance-type weighing means,
establishing liquid communication between said liquid columns,
evacuating said chambers at the regions thereof above said liquid columns,
balancing said weighing means,
introducing a fluid whose pressure is to be measured into said first chamber, and
rebalancing said weighing means to thereby weigh the mass of liquid which transfers into said second chamber as a result of said introducing step,
said mass being proportional to the pressure of said fluid according to the equation:

$$P = Mg\left(\frac{1}{A_1} + \frac{1}{A_2}\right)$$

wherein
P is the pressure of the fluid,
M is said weighed mass,
g is the acceleration due to local gravity,
$A_1$ is the area of one of said containers, and
$A_2$ is the area of the other of said containers.

References Cited

UNITED STATES PATENTS

| 703,753 | 7/1902 | Arndt | 73—405 |
| 904,511 | 11/1908 | Crowell | 73—405 |
| 2,669,869 | 2/1954 | Weber | 73—296 XR |

FOREIGN PATENTS

| 824,854 | 11/1937 | France. |
| 583,401 | 10/1924 | France. |

DONALD O. WOODIEL, Primary Examiner

U.S. Cl. X.R.

73—385